March 12, 1940.   K. W. JOOS   2,193,764
DEVICE FOR PRODUCING GROOVES IN THE WALLS OF BORES
Filed Sept. 6, 1938
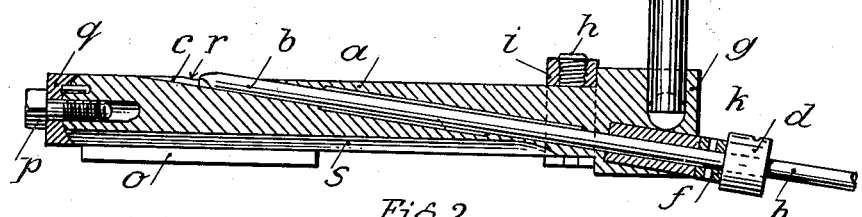
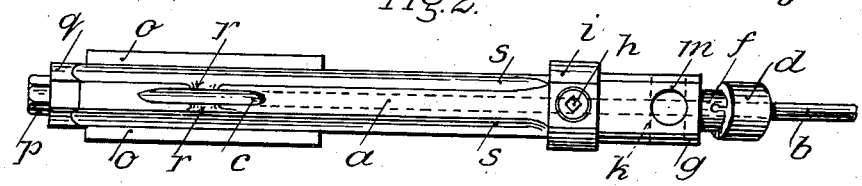
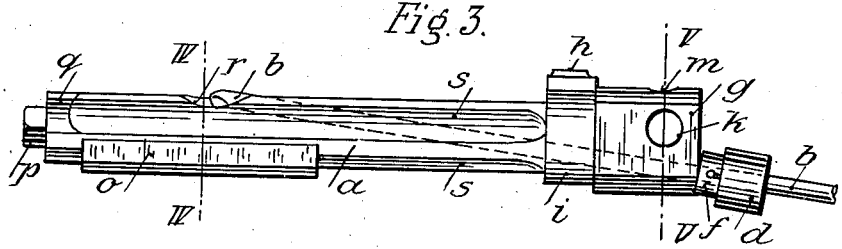
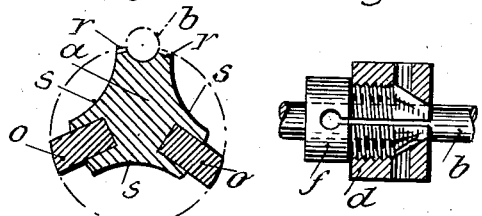 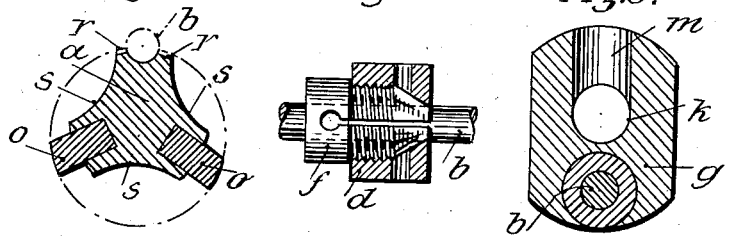
Inventor
Karl Wilhelm Joos
by
his Attorney Patented Mar. 12, 1940

2,193,764

UNITED STATES PATENT OFFICE 2,193,764

DEVICE FOR PRODUCING GROOVES IN THE WALLS OF BORES

Karl Wilhelm Joos, Leutersberg (Freiburg-Land), Germany

Application September 6, 1938, Serial No. 228,626
In Germany September 17, 1937

3 Claims. (Cl. 77—55)

The invention relates to a device for producing grooves in the walls of bores with the aid of a rotating tool which is mounted in a holder adapted to the diameter of the bore.

This device is characterized in that the drill-like tool, axially adjustable according to the depth of the groove to be cut, extends obliquely through the holder in such a manner that it can be driven directly from outside the bore.

The device is further characterized in that, for the reliable removal of the drilling chips, the holder has longitudinal throats as chip clearances, which are widened on the cutting portion of the tool up to the tool itself.

Finally, the holder has exchangeable insertion plates for adapting it to different sizes of bores, these plates being held by a clamping head engaging over the end of the holder and connected therewith by a bolt.

An embodiment of the invention is illustrated by way of example in the accompanying drawing, in which—

Fig. 1 shows the device in central longitudinal section,

Fig. 2 is a top plan view,

Fig. 3 is a side elevation,

Fig. 4 is a cross-section on line IV—IV of Fig. 3,

Fig. 5 is a cross-section on line V—V of Fig. 3,

Fig. 6 shows an adjustable abutment for the drill, partly in elevation and partly in longitudinal section.

The device comprises a holder $a$ with an oblique bore $c$ destined to receive a drill $b$ and extending from the rear end of the holder to within a short distance of the front end thereof. The depth of the lubricating channels or other grooves is determined by the distance the drill $b$ is pushed into the bore $c$. A clamping cone $f$ (Fig. 6) clamped on the drill $b$ by a cap nut $d$ limits the depth of the groove cut by the drill. The holder $a$, which is widened at its rear end to form a head $g$, has on its front end an abutment $i$ secured in position by a bolt and destined to limit the feed of the holder.

The head $g$ has two radial bores $k$ at right angles to one another for receiving in known manner a pin key $n$. With the aid of this key the device can be turned in the bore by hand or by a jig as is necessary for example when milling intersecting and helical grooves. A jig corresponding to the shape of the groove to be cut and in which the key $n$ engages may be used for positively guiding the device.

The device can be used in any position for drilling by means of a hand drilling machine.

To facilitate the leading off of the chips during the drilling operation the side walls of the holder are hollowed out at the point where the drill passes out at $r$ so that passages for the passing off of the chips are formed between the wall of the bore in which the groove is to be cut and the holder on both sides of the drill. The chips are led off by the aid of three throats extending in the longitudinal direction of the device (Fig. 4) in such a manner that they cannot impede the work of the drill.

For adapting the device to bores of different diameters preferably two plates $o$ are removably inserted at the front end of the holder $a$. By using plates of different thickness the device can be adapted within predetermined limits to different diameters of bores in which grooves are to be cut. These plates are held in position with the aid of a clamping head $q$ secured on the front end of the holder by a bolt $p$ and hollowed out for this purpose so that its edge engages the front ends of the plates fitting in this hollowed out portion.

The drill is driven at its rear end in any suitable manner.

If the holder has to be turned during the drilling operation when producing grooves other than rectilineal, for example intersecting or helical grooves, the drill is driven by a flexible shaft.

The device is used in the following manner:

The front end of the holder $a$, either alone or after being adapted to the size of the bore in which the groove is to be cut by the insertion of corresponding thick plates $o$, is pushed into this bore. The drill $b$ is then inserted in the oblique bore in the holder until the abutment $f$, $g$ just contacts with the rear end of the holder. The abutment $i$, $h$ on the holder $a$ must first be set to determine the length of the groove.

When drilling grooves which extend in a direction other than rectilineal, the device must be guided as required by turning and correspondingly feeding the device.

The reliable guiding of the device can be positively determined with the aid of a jig adapted to the shape of the groove to be cut.

I claim:

1. Device for cutting grooves in the walls of bores, comprising in combination an axially shiftable holder having an oblique bore, and a tool rotatably mounted and axially adjustable in said bore to determine the depth of the groove to be cut and projecting from the rear end of the bore for direct driving.

2. A device as specified in claim 1, in which the holder has at its front end longitudinal throats forming chip clearances on both sides of and extending up to the tool.

3. In a device as specified in claim 1, insertion plates adapted for different sizes of bores exchangeably fitted in the front end of the holder, a clamping head on the front end of the holder engaging over said plates, and a bolt securing said head on said holder.

KARL WILHELM JOOS.